June 4, 1957  P. A. SHAFFER, JR  2,794,361
ELECTRIC PHOTOMETER
Filed Nov. 14, 1952  2 Sheets-Sheet 1
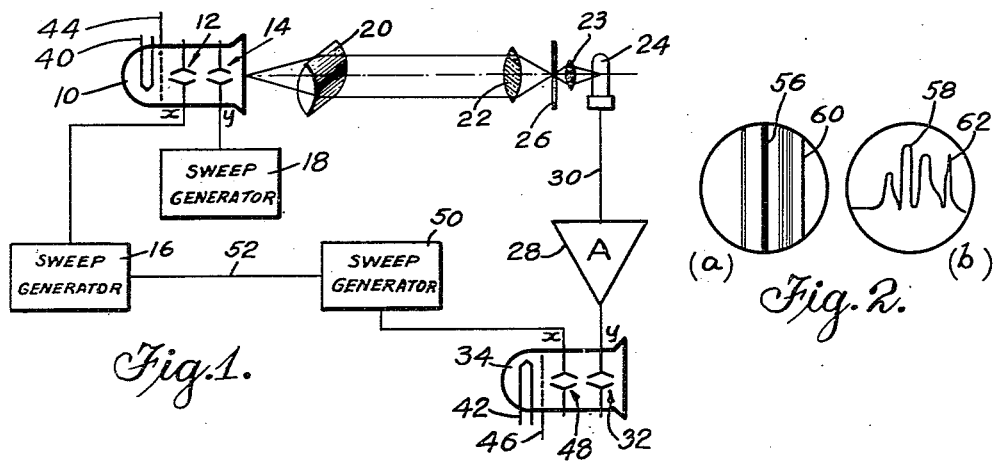
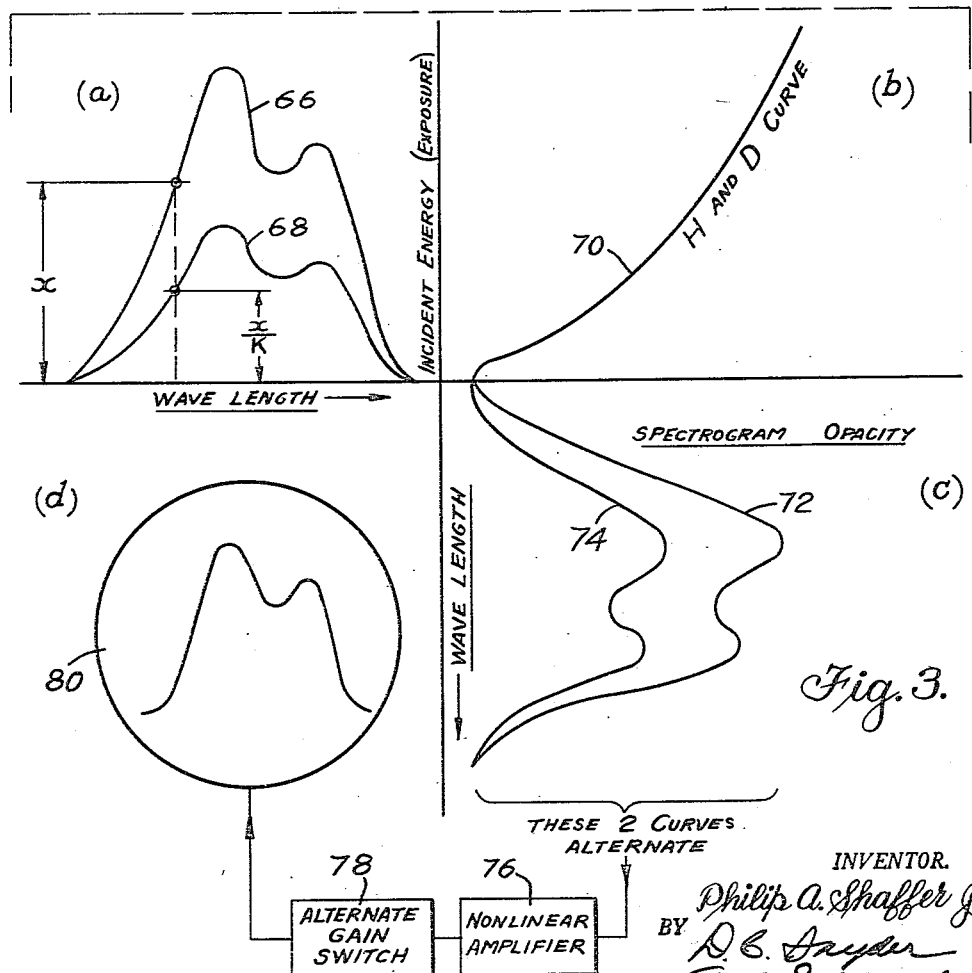
INVENTOR.
Philip A. Shaffer Jr.
BY
ATTORNEYS.

June 4, 1957     P. A. SHAFFER, JR     2,794,361
ELECTRIC PHOTOMETER
Filed Nov. 14, 1952     2 Sheets-Sheet 2

INVENTOR.
Philip A. Shaffer Jr.
BY
ATTORNEYS.

United States Patent Office 2,794,361
Patented June 4, 1957

2,794,361
ELECTRIC PHOTOMETER
Philip A. Shaffer, Jr., Pasadena, Calif.

Application November 14, 1952, Serial No. 320,632

6 Claims. (Cl. 88—14)

(Granted under Title 35, U. S. Code (1952), sec. 266)

The invention described herein may be manufactured and used by or for the Government of the United States of America for governmental purposes without the payment of any royalties thereon or therefor.

This invention relates to a photometer and more particularly to a photometer of the type wherein optical elements are supplemented by electronic elements.

In the measurement and assessment of photographic records of a spectral nature, typically those made in spectrochemical analysis and in molecular research by X-ray and electron diffraction, it is important that the incident energy recorded photographically be determined as accurately as possible.

Direct visual comparison of the test film with a standard is inadequate for precision measurements, and the application of phototubes to the measuring process has not been wholly satisfactory in the past. Difficulties are occasioned in part by the fact that the opacity of a photographic film is not linearly proportional to the incident energy causing the opacity. Nonuniform photographic emulsions and lighting also give rise to errors.

In the instant invention, a scanning cathode ray tube produces a moving point of light which is imaged on the photographic film under observation. A monitor circuit ensures that the intensity of the moving point of light remains uniform. A phototube translates light transmitted through the film into an electrical signal which varies with time in accordance with the spatial variations of photographic density, and a second cathode ray tube receives this signal and fashions a two dimensional, stationary presentation of the transmission of the film as a function of the position of the spot image. A nonlinear circuit between the phototube and the viewing tube corrects for film characteristics over a wide range, and a meter is provided for indicating the integrated value of the incident energy causing the opacity of the film under observation.

An object of this invention is to provide an optical-electronic photometer having improved operating characteristics.

Another object of the invention is to provide an apparatus for relating film opacity to the incident energy causing that opacity.

A further object is to provide apparatus for presenting opacity data as a two dimensional display related to the true incident energy of which the opacity is a function.

Other objects and many of the attendant advantages of this invention will be readily appreciated as the same becomes better understood by reference to the following description.

Fig. 1 is a diagram of a simplified form of the invention;

Fig. 2 is a view of a typical spectrogram and the photometric interpretation thereof;

Fig. 3 is a diagram of film characteristics and corrections therefor;

Figure 4:
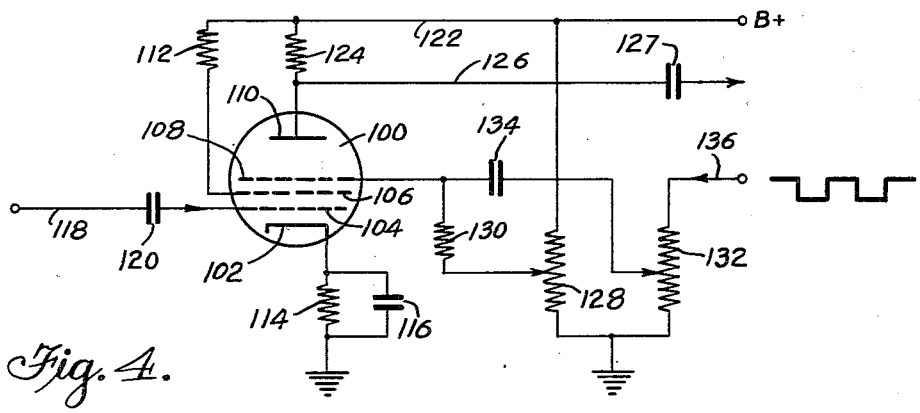
Fig. 4 is a schematic diagram of a variable gain switch.

The apparatus shown in Fig. 1 comprises a scanning cathode ray tube 10 in a conventional oscilloscope arrangement and having horizontal deflection plates 12 and vertical deflection plates 14. Sweep generator 18, generally driven at a higher frequency than sweep generator 16, is effective to vary the trace in a vertical direction. The trace thus simulates a light source in combination with a vertical optical slit moving horizontally across the tube. The rapid vertical sweep spaces the lines so closely that they are essentially vertical. The light from scanning tube 10 is focused by means of lens 22 and then directed to photomultiplier tube 24 through photographic film 26. Lens 20, if employed, must be cylindrical having the long axis parallel to the sweep along the X axis of tube 10. Lens 22 is spherical. A field lens 23 may be interposed between photographic film 26 and phototube 24 if desired. The output of photomultiplier tube 24 is applied to amplifier 28 by means of lead 30. The output of amplifier 28 is connected to the vertical deflection plates 32 of display cathode ray tube 34. Filaments 40 and 42 of tubes 10 and 34 respectively are heated by means of a conventional filament current source, not shown. Connections to grids 44 and 46 as the "Z axis" or brightness controls are not required for the operation of the simplified photometer. Horizontal deflection plates 48 are driven by sweep generator 50 which is tied in to sweep generator 16 by means of lead 52 so that the scanning and display traces start at the same time. This interconnection results in the formation of a stationary contour on the observing screen. The ordinate of this contour is an approximate indication of the transmission of the film as a function of the position of lines on the film, which position is shown on the abscissa.

A small area of a typical spectrogram is shown at Fig. 2a; Fig. 2b shows a corresponding contour-type display of the same area as it appears on viewing tube 34 of the apparatus shown in Fig. 1. A broad dense line 56 on the film appears as the relatively high and broad display curve 58. A narrow dense line 60 appears as a spike 62. It is also possible to obtain a video-like representation of the spectrogram information by connecting the outputs of sweep generators 16 and 18 to deflection plates 48 and 32 respectively of tube 34 and regulating the brightness of the viewing spot by coupling the output of amplifier 28 to grid 46. This type of presentation has certain advantages over the contour display above described, in that an enlarged projection of the spectrogram simulates the portrayal of widely used comparator systems. Another method of obtaining a video-like presentation is to simply connect the output of amplifier 28 degeneratively to grid 44 in which case the scanning tube becomes the viewing tube. The scanning spot is bright when little light is transmitted through a dense area on the film, and the spot brightness decreases as the film area under observation becomes less opaque. The outstanding advantage of this method of data presentation is that all problems of phosphor persistence are avoided.

In the operation of the apparatus thus far described, a spectrogram is positioned in such manner that the desired features are within the scan range of the spot from scanning tube. The selection of the range of the scanning spot is made with the sweep amplitude control of the scanning oscilloscope. If it is desired to observe the contour line shape under magnification, the ratio of the display sweep to the scan sweep may be increased. The magnification of the line shape is independent of the range covered by the scanning spot. The controls thus make it possible to locate a group of lines by searching with a low power of magnification and a large field which results from a wide scanning sweep, and then to "blow-up" a line of interest after it has been located. The display on tube 34 may be photographed or viewed directly.

In order to avoid errors it is often desirable to have an indication of the unformity of a particular line in the direction of the slit as well as a signal of film deficiencies such as pits or dust particles. Such an indication is obtained when the scanning spot is swept in a direction parallel to the slit direction, generally at a frequency much higher than the sweep normal to the slit. If, in the course of a sweep parallel to the slit, the spot encounters a hole, for example, the increased transmission causes the oscilloscope trace to fall to the base line or below the base line in case of a complete puncture and then to rise as the hole is crossed. The result is that the normally single line trace breaks into oscillation with an amplitude indicating the size of the defect. The oscillations produce an easily recognized, vertical, dark band which extends above the trace in the case of an opaque area such as a dust spot on the film, and extends below the trace where the opacity of the film has been reduced as by pin holes in the emulsion. This characteristic is very useful in detecting a dust spot which might, by customary methods, produce serious errors in the integrated value of a line.

In Fig. 3, the relationship between the intensity of incident light and the resulting transmission, or the reciprocal thereof which is opacity, of a photographic film is shown. This relationship is not linear but is of a complex nature first described by the British scientists Hurter and Driffield. For the purpose of measuring the total incident energy producing a spectral line or an electron or X-ray reflection, it is not permissible to simply integrate the opacity function of the resulting line or spot. A new curve of incident energy has common been constructed, usually point by point, from the opacity curve provided by existing photometric instruments, and this intensity curve integrated to give the desired total energy in the line or spot. This transformation has heretofore been instrumentally developed by the use of elaborate and complex systems of photographic wedges or equivalent prepared cams.

Assume two spectograms, adjacent to one another on the same film, whose ratio of exposure or incident energy is K. When the incident energy is plotted as a function of wavelength for the same lines in both spectra, the graph shown in Fig. 3(a) is obtained. Each point on the upper curve 66 is K times the ordinate of lower curve 68. The difference is shown as a factor of approximately 2 although K is unrestricted. It is this curve of incident energy which is of fundamental interest and significance. The photographic process results in a negative, the opacity of which is related to the incident energy by the H and D curve 70 shown at Fig. 3(b). At Fig. 3(c) the two plots of opacity versus wavelength at Fig. 3(a) are drawn by the projection of curves 66 and 68 in curve 70. The ratios of the ordinates of projected curves 72 and 74 are no longer constant with wavelength, and a constant ratio of K does not exist. It is obvious that if curves 72 and 74 were reflected back again in a curve similar to line 70, the original lines 66 and 68 would be restored having the constant ratio K. This reflecting back may be carried out by means of nonlinear amplifier 76, alternate gain switch 78, and cathode ray tube face 80. The purpose of nonlinear amplifier 76 is to amplify low intensity signals by a factor which is not the same as the factor by which high intensity signals are amplified. The different amplification factors compensate for the fact that opacity of a film produced by the influence of light is not linearly proportional to the intensity of the light. The nonlinearity of the amplifier also compensates for the nonlinearity of the photomultiplier tubes and for other instrumental errors. The two spectra which are under test are alternately scanned. This may be done, for example, by using a square wave of half the sweep frequency to deflect the scanning spot parallel to the slit image. Another way to obtain the desired information is to use a separate photomultiplier tube for each spectrum. The lines to be examined are commonly only about 1 mm. long; the length of the lines is not significant compared to the size of the lenses used in the optical system. The signals resulting from the scanning of the two spectra are alternately connected to amplifier 76 by means of an electronic switch which may be any one of many known types since its function is merely that of switching. The rate of switching is controlled by a square wave input to the electronic switch which is thus synchronized with the operation of the alternate gain switch. The nonlinear amplifier is equipped with several control knobs which permit the nature of the response curve (output voltage versus input voltage) to be varied qualitatively over the desired range of nonlinearity. Many known circuits are capable of providing an adequate functional range for this purpose. It has been found that a very satisfactory control results when the control and screen grid bias voltages are varied to vary the nonlinear transfer characteristics of remote control pentodes such as type 6SK7 tubes.

The output of the nonlinear amplifier passes to alternate gain switch 78, the function of which is to provide alternately gain M and gain MK; the value of M is not significant but the value for K is important. Well known means such as suppressor controlled tubes, for example, serve to make the ratio K of such a linear amplifier adjustable between remote limits. A suitable alternate gain switch is shown in Fig. 4. The output of the gain switch, which is driven by the X-axis scanning tube sweep generator, is applied to the vertical input of the display oscilloscope 80. Before correction takes place, two dissimilar curves will be displayed. However, if the gain switch is adjusted so that its gain ratio is equal to the exposure ratio K, and if the response characteristic of the nonlinear amplifier is adjusted by means of the manual controls to conform to curve 70, then the two curves displayed on the viewing cathode ray tube at Fig. 3(d) will be accurately superimposed and they will be similar in shape to the two curves 66 and 68. In other words, superposition of the two curves is possible only when the gain switch ratio is equal to K and when the nonlinearity of the amplifier differs by a constant factor from the film characteristic. Therefore, when the two oscilloscopic curves are superposed by manipulation of the nonlinearity and gain controls, the resulting superposition is geometrically similar to curves 66 and 68 which accurately represent the incident energy of the spectrum.

The procedure for adjusting the apparatus for conversion is not complicated. Two exposures of the same subject matter but of different duration are made. The developed film is positioned so that the two areas are alternately swept by the scanning beam. If the exposure ratio is known, the gain switch may be set for the value of K. The several nonlinearity controls are varied in any manner and left in that condition which most closely satisfies the visual criterion of superposition. If K is not known, adjustment of the gain ratio is also involved in the optimization. The eye provides a simple and effective means of estimating the overall degree of superposition of traces on the cathode ray tube in a roughly least squares fashion. For the greatest accuracy it is desirable that the exposures differ by at least a factor of 2.

Once the optimization has been carried out, it is valid for all spectra in a region of the wavelength for which the film characteristic is sensibly constant. Because the two curves are matched visually, the various controls need not produce independent results. It is not necessary to make any quantitative use of the values of the control settings so there is no purpose in having graduated control knobs. The conversion procedure may be carried out without any other information than that the two spectra are made on the same photographic material and that they are due to similar spectral energy distributions.

The alternate gain switch shown in Fig. 4 comprises a vacuum tube 100 which may conveniently be a type 6AS6 pentode, which is designed for suppressor control, having a cathode 102, control grid 104, screen grid 106, suppressor grid 108, and plate 110. Screen grid 106 is connected to the plate circuit through resistor 112, and cathode 102 is connected to ground through a network consisting of resistor 114 and capacitor 116. The input signal, which is derived from the nonlinear amplifier system, goes to grid 104 through lead 118 and capacitor 120. Plate 110 is connected to a plate voltage supply through lead 122 and resistor 124. Output lead 126 is connected to the juncture of plate 110 and resistor 124 and includes capacitor 127 to capacitively couple the plate output to the following cathode ray tube. Potentiometer 128 is effective to apply a variable voltage through resistor 130 to suppressor grid 108. The output of potentiometer 132, through capacitor 134, is also applied to suppressor grid 108. Lead 136 provides an input for a square wave to potentiometer 132.

In the operation of the above described circuit, the incoming signal from the nonlinear amplifier is applied to grid 104 and a corresponding output is obtained at plate 110. The transconductance of the tube may be controlled by varying the voltage on suppressor grid 108 by means of potentiometer 128. When a square wave signal is also applied to grid 108, the amplifier gain will be alternately high and low. The magnitude of the difference in gain when the square wave is applied is controlled by means of potentiometer 132. The square wave which drives grid 108 is the control signal applied to the electronic switch which alternately feeds the two photomultiplier outlets to the nonlinear amplifier, so the actions of the electronic switch and the variable gain switch are synchronized.

Figure 5:
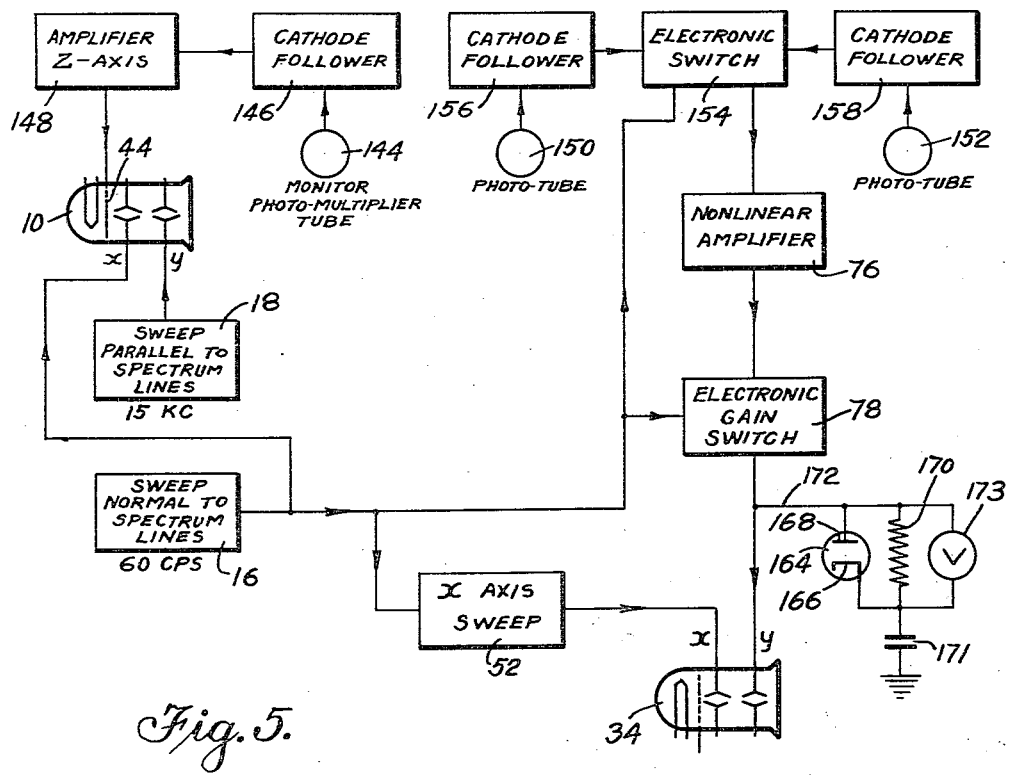
Fig. 5 is a block diagram of a form of the invention.

In Fig. 5 a block diagram shows the elements of a modified form of photometer. The monitor system comprises a photomultiplier tube 144 which is positioned to see the spot of light from the scanning cathode ray tube 10. A cathode follower 146 is utilized to prevent capacitive loading of photomultiplier tube 144. The output of cathode follower 146 is amplified in amplifier 148 and applied to the intensity control 44 of cathode ray tube 10 degeneratively. If the loop-gain, which here includes both circuit and optical factors, is sufficiently high, the variations in spot intensity can be reduced to a negligible percent. The feedback control of the scanning cathode ray tube has been found to be much superior to voltage source stabilization, frequency discrimination to remove granularity effects, and photographic superposition masks to cancel inhomogeneities. A very satisfactory monitor system includes a type 931–A photomultiplier followed by a type 6AC7 tube operating as a triode cathode follower. A Hewlett-Packard 450A amplifier is used to provide additional loop gain; the output of this amplifier is applied directly to the control grid of the scanning spot tube. Corrections for phosphor persistence are normally not required but may be made if desired by feeding the output of the viewing photomultiplier tube 24 to an amplifier having a differentiator circuit to perform operations which are the inverse of operations performed by the phosphor.

Means for compensating for the H and D curve include photomultiplier tubes 150 and 152. One photomultiplier tube is preferably positioned adjacent each of the two exposures on the film, but a single photomultiplier may be used if desired. Electronic switch 154 connects the output signals of tubes 150 and 152, after passing through cathode followers 156 and 158 respectively, to nonlinear amplifier 76. The output of amplifier 76 goes to alternate gain switch 78 previously described. When the viewed area of a spectrogram is changed, a change in the base line of the display seen in viewing cathode ray tube 34 will occur. This is so because the oscilloscope is A. C. connected and ignores the constant terms necessary to maintain the base line in a fixed position regardless of the structure of the superposed spectrum. The D. C. component of the signal is lost when it passes through capacitive couplings. This disadvantage is overcome by using a D. C. restorer to adjust the deflection bias so that the lowest point of the trace, which is the base line, always lies at a specified level. The D. C. bias produced by the D. C. restorer in achieving this result is equal to the average value of the waveform, which in turn is defined by the integral of the waveform ordinate divided by the sweep range. Thus it can be seen that the voltage produced by the D. C. restorer in maintaining a fixed base line is proportional to the integrated value, a quantity which is often of more significance than the line shape or peak value. The D. C. restorer consists of diode 164, having cathode 166 and plate 168, which is connected across resistor 170 which in turn is connected between ground through capacitor 171 and lead 172. Heater filaments for diode 164 and for the vacuum tubes shown in the other circuits are not shown since their presence will be understood. A high impedance voltmeter 173 is connected effective to indicate the voltage across resistor 170.

Diode 164 clamps the most negative excursions of the signal on lead 172 to a specified voltage level which in this case is ground potential. The theory of D. C. restorers is discussed at length at vol. 18, MIT Radiation Laboratory Series 1948, p. 96 et seq. An alternative method of manually obtaining the integrated value of scanned lines is to simply measure the voltages applied to the vertical deflection plates of the viewing cathode ray tube by the oscilloscope centering control potentiometer. The centering control is positioned so that the base line of the display rests on a fixed reference line and a voltmeter indicates the bias voltage corresponding to the integrated value of the curve under observation. The measured voltage may be observed directly or it may be recorded on a chart or on photographic paper. Other information presented by the photometer may similarly be recorded.

Obviously many modifications and variations of the present invention are possible in the light of the above teachings. It is therefore to be understood that within the scope of the appended claims the invention may be practiced otherwise than as specifically described.

What is claimed is:

1. An electric microphotometer comprising sweep generators, a scanning cathode ray tube, connecting means effective to connect a first sweep generator to said scanning tube to produce a point of light moving back and forth relatively slowly in a straight line, similar connecting means effective to produce a short rapid sweep perpendicular to said straight line to simulate a variable width optical slit, a light monitor system including a first photoelectric cell and associated control circuit effective to maintain the intensity of the light produced by said cathode ray tube constant, a viewing cathode ray tube having horizontal deflection plates connected to said first sweep generator to synchronize the horizontal component of the image produced in said viewing tube with the relatively slowly moving point of light in the scanning tube, a film spectrogram having two different exposures of the same lines, holding means effective to position the film, a second photoelectric cell, optical means to image the light produced by said scanning tube on said film so that light passing through the film impinges upon said second photoelectric cell, circuit means effective to add a controllable D. C. bias to said vertical deflection plates to position the base line of the display at a specified level, measuring means effective to measure said D. C. bias voltage which is proportional to the integrated value of the waveform display, and electrical means for film compensation comprising switching means for alternately directing light from said scanning cathode ray tube through the two exposures of said spectrogram, a nonlinear amplifier with controllable nonlinearity to amplify low intensity signals by a factor which is different from the factor by which high intensity signals are amplified, said different amplification factors being such as to compensate for difference in the opacity of said film spectrogram exposures, said nonlinearity amplifier also compensating for nonlinearity of said phototubes and instrumental errors, means for connecting the output signals from said second photoelectric cell as an input signal to said nonlinear amplifier, an alternate gain switch synchronized with said switching means and effective to alternately amplify the output signals of said nonlinear amplifier by different factors whereby the alternate gain switch output signals representing the two exposures of said spectrogram are made equal in magnitude, and means for connecting the output signals of said alternate gain switch to said viewing cathode ray tube.

2. A compensator for nonlinear characteristics of a photographic film comprising means for scanning with a light beam a plurality of photographic images differing only in exposure ratios, means for translating transmitted scanning light to corresponding electrical signals, means for alternately nonlinearly amplifying said electrical signals, said nonlinear amplifying means being such as to amplify low intensity signals by a factor which is different from the factor by which high intensity signals are amplified, said different amplification factors being such as to compensate for differences in the capacity of said photographic images means for adjusting the amplified signals to the same amplitude, a cathode ray tube, and means for presenting said adjusted signals as traces on said cathode ray tube.

3. An electronic microphotometer comprising means for producing a narrow beam of light, a photosensitive detector, means for imaging said beam of light on said detector, a film spectrogram having two different exposures of the same lines thereon, scanning means for alternately directing said light beam through the two different exposures of said film spectrogram, means for nonlinearly amplifying the two outputs of said detector tube, means for controlling the nonlinear characteristics of said amplifying means, said amplifying means being such as to amplify low intensity signals by a factor which is different from the factor by which high intensity signals are amplified, said different amplification factors being such as to compensate for difference in the opacity of said film spectrogram exposures means for equating the amplitudes of the alternate outputs of said amplifying means, means for presenting the alternate outputs of said amplitude equating means as traces on a cathode ray tube screen, and means for synchronizing the operation of said light directing means and said amplitude equating means and said output presenting means.

4. The invention defined in claim 3 comprising in addition a second photosensitive detector adapted to view said beam of light, means for amplifying the output of said second detector, and means for applying the output of said amplifying means degeneratively to the intensity control of said means for producing said beam of light whereby the intensity of said light beam is maintained constant.

5. The invention defined in claim 3 comprising in addition a D. C. restorer adapted to control the position of the traces on said cathode ray tube screen, and means for indicating the voltage across said D. C. restorer.

6. A microphotometer comprising a scanning light source adapted to produce an effective moving light beam along a slit, a first phototube adapted to view the light from said light source, a second phototube adapted to view the light from said light source, means for positioning a film spectrogram having at least two different exposures of the same lines thereon in the path of said scanning light beams to said two phototubes, switching means effective to alternately direct the output of said phototubes to an adjustable nonlinear amplifier, said nonlinear amplifier being such as to amplify low intensity signals by a factor which is different from the factor by which high intensity signals are amplified, said different amplification factors being such as to compensate for difference in the opacity of said film spectrogram exposures, a variable gain switch effective to amplify alternate outputs of said nonlinear amplifier by different factors, means for synchronizing the operation of said switching means with said variable gain switch, a cathode ray tube, and means for presenting the outputs of said variable gain switch as a display on said cathode ray tube.

References Cited in the file of this patent

UNITED STATES PATENTS

| | | |
|---|---|---|
| 1,878,891 | Robinson | Sept. 20, 1932 |
| 2,188,679 | Dovaston et al. | Jan. 21, 1940 |
| 2,277,421 | Suits et al. | Mar. 24, 1942 |
| 2,467,057 | Simmon | Apr. 12, 1949 |
| 2,528,020 | Sunstein | Oct. 31, 1950 |
| 2,528,977 | Simmon | Nov. 7, 1950 |
| 2,540,016 | Sunstein | Jan. 31, 1951 |
| 2,626,989 | Brown | Jan. 27, 1953 |

FOREIGN PATENTS

| | | |
|---|---|---|
| 528,701 | Great Britain | Nov. 5, 1940 |